United States Patent [19]
Sun et al.

[11] Patent Number: 6,128,206
[45] Date of Patent: Oct. 3, 2000

[54] CLAMPING CIRCUIT AND METHOD FOR SYNCHRONOUS RECTIFICATION

[75] Inventors: Mark N. Sun; William Hart, both of Plano, Tex.

[73] Assignee: Ericsson, Inc., Research Triangle Park, N.C.

[21] Appl. No.: 09/267,000

[22] Filed: Mar. 12, 1999

[51] Int. Cl.[7] .......................... H02M 7/217; H02M 1/00
[52] U.S. Cl. .............................. 363/127; 363/144; 363/89
[58] Field of Search .............................. 363/127, 21, 143, 363/144, 89; 323/222, 255, 247

[56] References Cited

U.S. PATENT DOCUMENTS

| | | |
|---|---|---|
| 4,607,319 | 8/1986 | Assow et al. . |
| 5,543,704 | 8/1996 | Thoren . |
| 5,544,033 | 8/1996 | Sundstrom et al. . |
| 5,590,032 | 12/1996 | Bowman et al. . |
| 5,734,563 | 3/1998 | Shinada . |
| 5,804,952 | 9/1998 | Chen ........................................ 323/255 |
| 5,870,299 | 2/1999 | Rozman . |
| 5,872,705 | 2/1999 | Loftus, Jr. et al. . |
| 5,877,947 | 3/1999 | Chen et al. . |
| 5,946,202 | 8/1999 | Balogh ...................................... 363/26 |

OTHER PUBLICATIONS

Dhaval B. Dalal., "A 48V, 1.5kW, Front–End Zero–Voltage–Switched, PWM Converter with Lossless Active Snubbers for Output Rectifiers*", 1993 IEEE APEC Proceedings pp. 722–728, No Month Available.

Ionel Dan Jitaru, "Constant Frequency, Forward Converter with Resonant Transition", Jun. 1991 Proceedings of the HFPC, pp. 282–292.

N. Murakami, et al. "A Highly Efficient, Low–profile 300–W Power Pack for Telecommunications Systems", May 1994 IEEE APEC Proceedings, pp. 786–792.

J. A. Sabate, et al., "High–Voltage, High–Power, ZVS, Full–Bridge PWM Converter Employing an Active Snubber", VEPC Seminar 1991, pp. 125–130, No Month.

Nobuhiko Yamashita, et al., "A Compact, Highly Efficient 50–W On–board Power Supply Module for Telecommunications Systems", Oct. 1995, IEEE APEC Proceedings, pp. 297–302.

Teruhiko Kohama, et al. "Analysis of Abnormal Phenomena Caused by Synchronous Rectifiers in a Paralleled Converter System", Mar. 1998 IEEE Proceedings, pp. 404–411.

Y.Nakayashiki, et al., "High–Efficiency Switching Power Supply Unit with Synchronous Rectifier", Mar. 1998 IEEE Proceedings, pp. 398–403.

Carl Blake,et al., "Synchronous Rectifiers versus Schottky Diodes: A Comparison of the Losses of a Synchronous Rectifier Versus the Losses of a Schottky Diode Rectifier", May 1994 IEEE Proceedings, pp. 18–23.

*Primary Examiner*—Peter S. Wong
*Assistant Examiner*—Rajnikant B. Patel
*Attorney, Agent, or Firm*—Jenkens & Gilchrist, P.C.

[57] ABSTRACT

A rectifier circuit having voltage clamping circuitry is disclosed. The rectifier circuit includes a transformer having a primary winding and a secondary winding and transistor switches each being connected to an end of the secondary winding of the transformer. The rectifier circuit further includes a first diode having an anode terminal connected to a first end of the secondary winding and a second diode having an anode terminal connected to a second end of the secondary winding. The cathode terminals of the first and second diodes are coupled to a capacitor. The energy stemming from voltage spikes and/or high frequency ringing appearing at the transistor switches due to parasitic effects is effectively absorbed by the first and second diodes and collected in the capacitor. The collected energy is recycled to control the operation of the transistor switches.

28 Claims, 6 Drawing Sheets

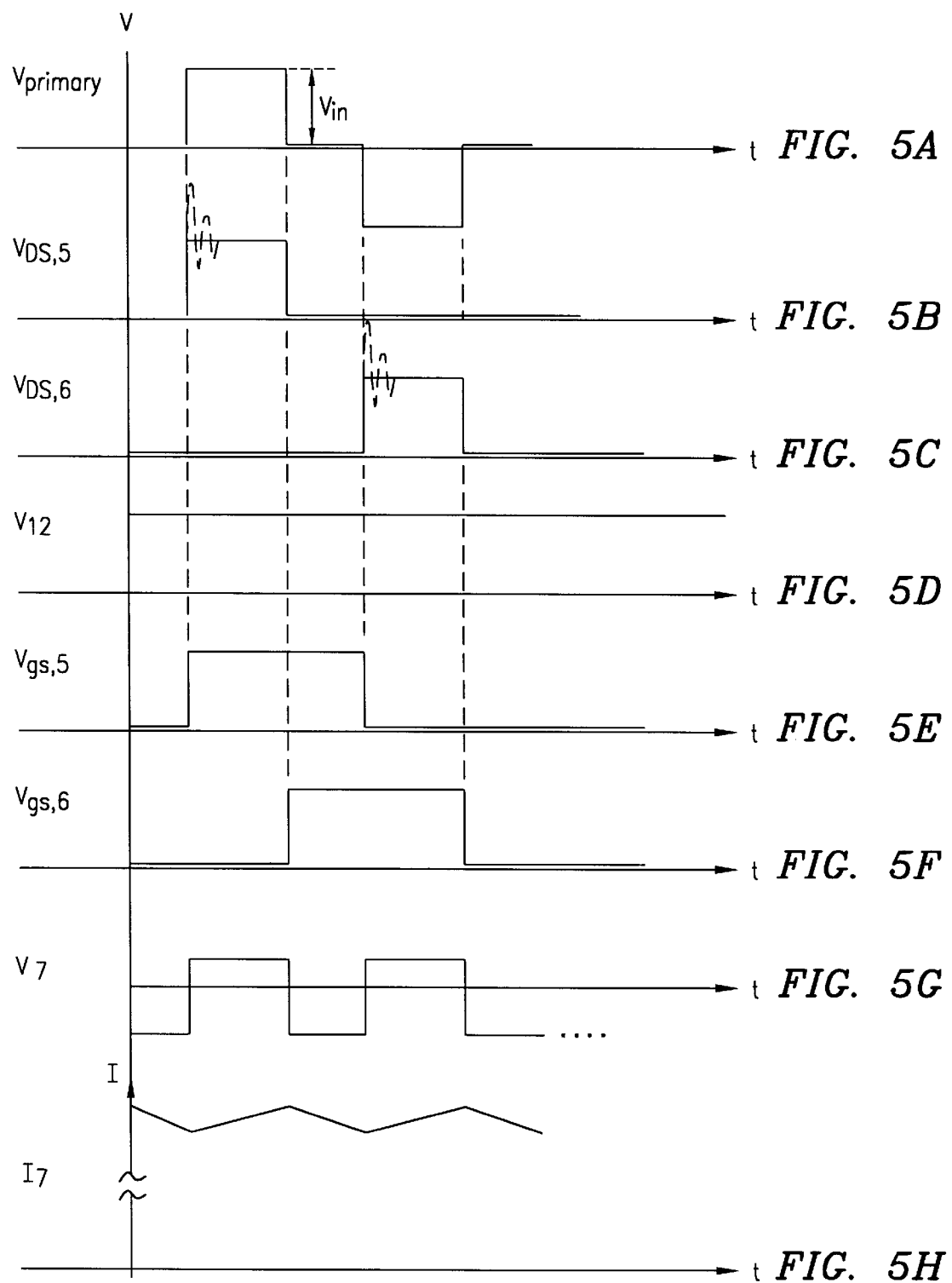

CLAMPING CIRCUIT AND METHOD FOR SYNCHRONOUS RECTIFICATION

BACKGROUND OF THE INVENTION

1. Technical Field of the Invention

The present invention relates to a power converter, and particularly to a synchronous rectifier having voltage limiting circuitry.

2. Background and Objects of the Invention

Power converters are known to convert an input voltage waveform having a DC component into a DC voltage waveform. Power converters employing an isolation transformer require employment of a rectification circuit to perform waveform conversion. Traditionally, rectifier circuits utilize diodes connected to the secondary side of the isolation transformer which conduct current only when forward biased. Synchronous rectifiers instead utilize transistor switches which are selectively turned on and off in synchronicity with the signal to be rectified in order to control conduction of current from the isolation transformer to the rectifier output.

The advancement in computational speeds and densities of integrated circuitry and corresponding systems has led to a reduction in the operating voltages thereof. Power supplies are accordingly expected to provide increased current at lower voltages while occupying less area. Because power loss through the diodes or transistor switches within a rectifier may account for nearly 40–50% of the total power loss in the power supply, employment of diodes having a low forward bias and/or transistor switches having low on-resistances are most desirous.

Large voltage spikes and high frequency ringing are typically generated within a rectifier during fast switching transitions, primarily due to the presence of parasitic inductances in the transformer and parasitic capacitances in the transistor switches. As a result, higher rated devices are needed to prevent breakdown of the diodes and/or transistor switches. Because use of the higher rated devices increases the power loss, such use to suitably handle the excessive voltage spikes and high frequency ringing conflicts with the need for employing diodes and transistor switches to suitably maintain low power loss.

In response to this situation, attempts have been previously made to suppress the high voltage spikes and high frequency ringing using additional circuitry. For instance, RC snubber circuits have been utilized which somewhat reduce peak voltages and dampening oscillations. However, the snubber circuits (FIG. 1) dissipate a noticeable amount of power and peak voltages within the rectifier nonetheless remain. Active clamping circuits (FIG. 2) have been previously proposed to suppress the voltage spikes. The active clamping circuits, however, substantially increase the complexity and component count of the rectifier. Consequently, there exists a need for a rectifier having reduced voltage spikes and high frequency ringing.

It is an object of the present invention to provide a rectifier circuit for use in a power supply which substantially eliminates voltage spikes and high frequency ringing.

It is another object of the present invention to provide a rectifier circuit having reduced power loss.

Another object of the present invention is to provide a rectifier circuit which minimally increases component count and power consumption of the rectifier.

Still another object of the present invention is to provide a rectifier circuit for a power supply which is simple in design and inexpensive to manufacture.

SUMMARY OF THE INVENTION

The present invention overcomes the shortcomings in existing power supplies and satisfies a significant need for a power supply having improved performance levels.

According to a first embodiment of the present invention, there is provided a rectifier circuit which reduces voltage spikes and high frequency ringing caused by parasitic components therein. The rectifier circuit is a synchronous rectifier having at least two transistor switches connected to the secondary side of a transformer. The transistor switches are selectively switched between conductive and non-conductive states by control signals generated from the primary side and secondary side of the isolation transformer via a control circuit. The present invention includes a first voltage clamping component having a first terminal which is connected to a first end of the secondary side of the transformer, and a second voltage clamping component having a first terminal which is connected to a second end of the secondary side of the transformer. The present invention further includes a third component connected to a second terminal of the first and second voltage clamping components. The third component additionally drives the control circuit.

When either of the transistor switches is switched into the non-conductive state, a relatively large voltage spike and high frequency ringing are induced thereat due to a parasitic inductance and capacitance in the transformer and transistor switch, respectively. The energy corresponding to the voltage spike and high frequency ringing is absorbed by the first and second voltage clamping components and collected in the third component. The absorbed energy is recycled to the control circuit for controlling the transistor switches.

In a first preferred embodiment of the present invention, the rectifier circuit is a full wave synchronous rectifier. The present rectifier circuit also may be implemented as a half wave synchronous rectifier, a full wave diode rectifier and a half wave diode rectifier.

BRIEF DESCRIPTION OF THE DRAWINGS

A more complete understanding of the system and method of the present invention may be obtained by reference to the following Detailed Description when taken in conjunction with the accompanying Drawings wherein:

FIGS. 5A–5H are a series of voltage waveforms illustrating the operation of the present invention shown in FIG. 3;

DETAILED DESCRIPTION OF THE PREFERRED EXEMPLARY EMBODIMENTS

The present invention will now be described more fully hereinafter with reference to the accompanying drawings in which preferred embodiments of the invention are shown. This invention may, however, be embodied in many different forms and should not be construed as being limited to the embodiments set forth herein. Rather, the embodiments are is provided so that this disclosure will be thorough and complete, and will fully convey the scope of the invention to those skilled in the art.

Figure 1:
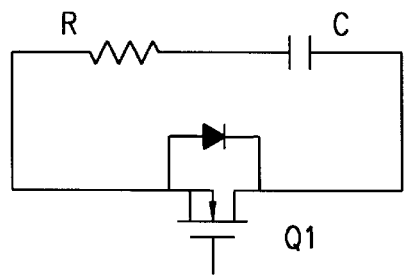
FIG. 1 is a schematic diagram of a conventional RC snubber circuit.
Figure 2:
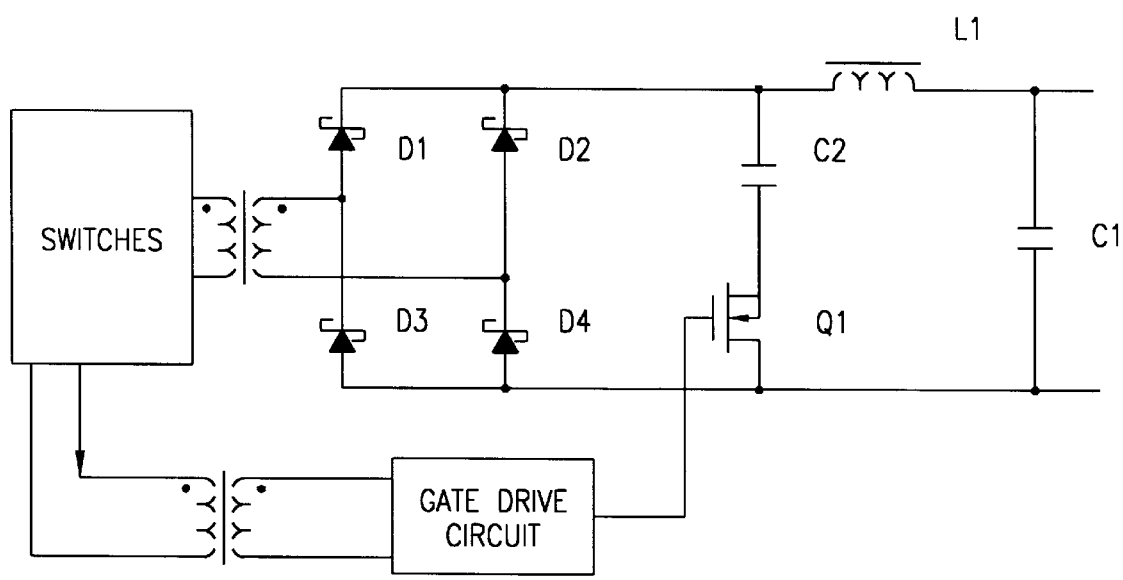
FIG. 2 is a schematic diagram of a known active clamp circuit for a synchronous rectifier.
Figure 3:
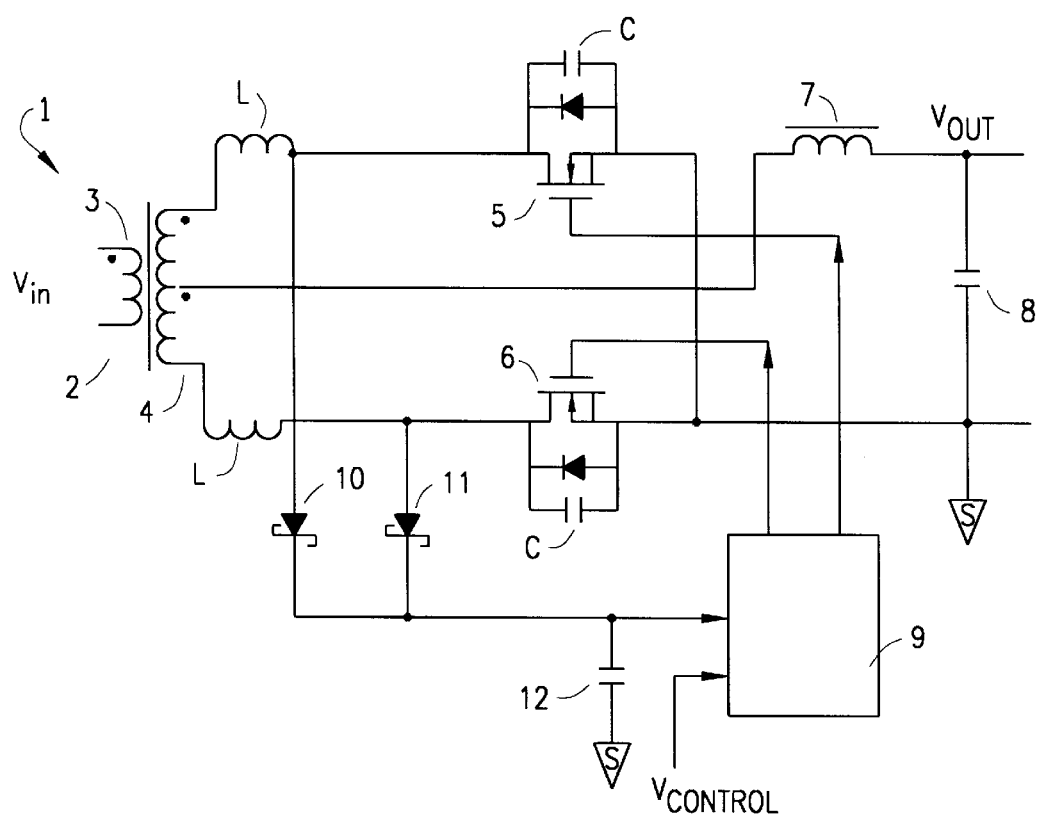
FIG. 3 is a schematic diagram of a full wave rectifier circuit according to a preferred embodiment of the present invention.

Referring to FIG. 3, there is shown a rectifier circuit 1 according to a preferred embodiment of the present invention as part of a power supply. Rectified circuit 1 of FIG. 3 is a full wave synchronous rectifier circuit including transformer 2 having primary side or winding 3 and secondary side or winding 4, and transistor switch 5 having a first terminal connected to a first end of secondary winding 4 and a second terminal connected to a ground reference. Rectifier circuit 1 further includes a second transistor switch 6 having a first terminal connected to a second end of secondary winding 4 and a second terminal connected to the ground reference. Although transistor switches 5 and 6 are implemented in FIG. 3 as field-effect transistors and particularly n-channel field-effect transistors, it is understood that switches 5 and 6 may be implemented as other transistors and/or switching elements.

Rectifier circuit 1 further includes inductor 7 having a first terminal connected to secondary winding 4 and a second terminal connected to a first plate of capacitor 8. The second plate of capacitor 8 is tied to the ground reference. The output of the power supply is a substantially DC voltage signal Vout, shown in FIG. 3.

Rectifier circuit 1 further includes control circuitry 9, having outputs which drive the control (gate) terminals of transistor switches 5 and 6. Control circuitry 9 includes, among other inputs, a control signal Vcontrol which is based upon the voltage appearing across transformer 2. As a result, transistor switches 5 and 6 are selectively switched between conductive and non-conductive states, i.e., turned on and off, in synchronicity with the voltage appearing across transformer 2.

In rectifier circuit 1, parasitic devices may be present which adversely impact the performance of rectifier circuit 1. In particular, transformer 2 may include leakage inductances L formed at the ends of the secondary side 4 thereof. Further, transistor switches 5 and 6 may each include a parasitic capacitance C appearing between the drain and source terminals thereof. It has been observed that, due to the presence of parasitic leakage inductances L and parasitic capacitances C, a relatively sizeable voltage spike and high frequency ringing appear at transistor switches 5 and 6 when switches 5 and 6 are individually turned off. To eliminate this parasitic effect, the present invention preferably includes clamping diodes 10 and 11 having their respective anode terminals tied to the first end and second end of the secondary side 4 of transformer 2, respectively, and having their cathode terminals tied to a first plate of capacitor 12.

Clamping diodes 10 and 11 are preferably Schottky diodes in order to provide a small forward bias. Capacitor 12 is preferably relatively large sized such that the energy stemming from the voltage spikes and high frequency oscillations appearing at the ends of the secondary side 4 of transformer 2 are absorbed by capacitor 12. The voltage appearing across capacitor 12 is substantially a DC voltage having a voltage amplitude Vc approximately represented by $$Vc=(N2/N1)*Vin,$$

where N1 is the number of turns in the primary winding 3 of transformer 2, N2 is the number of turns in the secondary winding 4 of transformer 2, and Vin is the input voltage appearing at the primary side 3 of transformer 2.

Figures 4A, 4B:
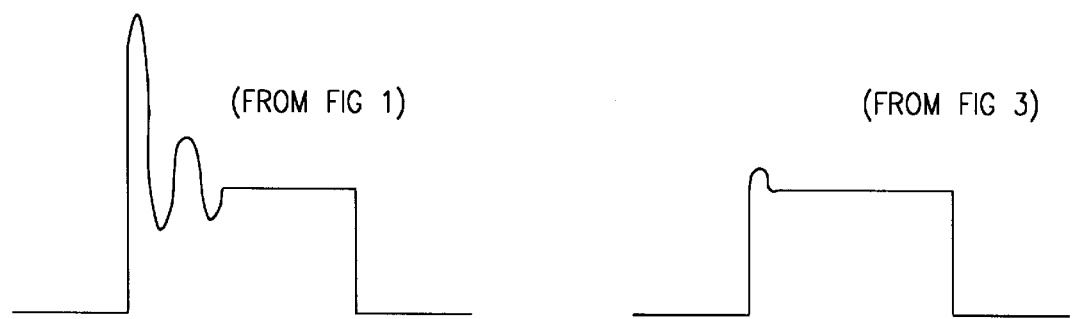
FIGS. 4A and 4B illustrate voltage waveforms which are internal to the rectifiers of FIGS. 1 and 3, respectively.

FIGS. 4A and 4B illustrate the ability of the present rectifier circuit 1 to clamp voltages so as to eliminate excessive voltage spikes and ringing effects. FIG. 4A shows the voltage appearing across a transistor switch 5 or 6 when an RC snubber circuit is employed in the power supply, and FIG. 4B shows the voltage appearing across a transistor switch 5 or 6 with the present rectifier circuit 1 is employed in the power supply.

In addition to capacitor 12 and clamping diodes 10 and 11 acting to clamp excessive voltages appearing at either end of the secondary winding 4 of transformer 2, capacitor 12 and clamping diodes 10 and 11 also recycle the energy absorbed by capacitor 12 to control the operation of transistor switches 5 and 6. The voltage appearing across capacitor 12 is applied to control circuitry 9. Control circuitry 9 receives the digital control signal Vcontrol and generates output signals for driving the gate terminals of transistor switches 5 and 6. The amplitude of the output signals of control circuit 9 is preferably based upon the voltage appearing across capacitor 12. In this way, the energy absorbed by capacitor 12 through diodes 10 and 11 are cycled back through rectifier circuit 1 so as to prevent instability.

FIGS. 5A–5H illustrate the operation of rectifier circuit 1 according to the present invention. FIG. 5A shows the input signal Vin applied to the primary side 3 of transformer 2. On the secondary side, with suitable rectification, the voltage appearing at the top end of secondary winding 4 is shown in FIG. 4B, and the voltage appearing at the bottom end of secondary winding 4 is shown in FIG. 5C. Illustrated in dashed lines in FIGS. 5B and 5C are the voltage spike and high frequency ringing effect seen in conventional designs which are substantially eliminated in the present invention. The energy from the voltage spike and high frequency ringing is absorbed through diodes 10 and 11 and collected in capacitor 12 as a substantially DC voltage (FIG. 5D). The voltage across capacitor 12 (and hence the energy absorbed from the voltage spikes and high frequency ringing) is recycled through control circuit 9 to drive the gate terminals of transistor switches 5 and 6. The amplitude of the gate drive signals, shown in FIGS. 5E and 5F, is based upon the voltage across capacitor 12. As can be seen, transistor switch 5 is turned on primarily during the positive phase of input voltage Vin (FIG. 5A) and transistor switch 6 is turned on primarily during the negative phase thereof. The voltage and current waveforms of inductor 7 are shown in FIGS. 5G and 5H, respectively. Noting that the amplitude of the current levels in FIG. 5H is small relative to the voltage across output capacitor 8, the output of rectifier circuit 1 is substantially a DC voltage waveform.

Figure 6:
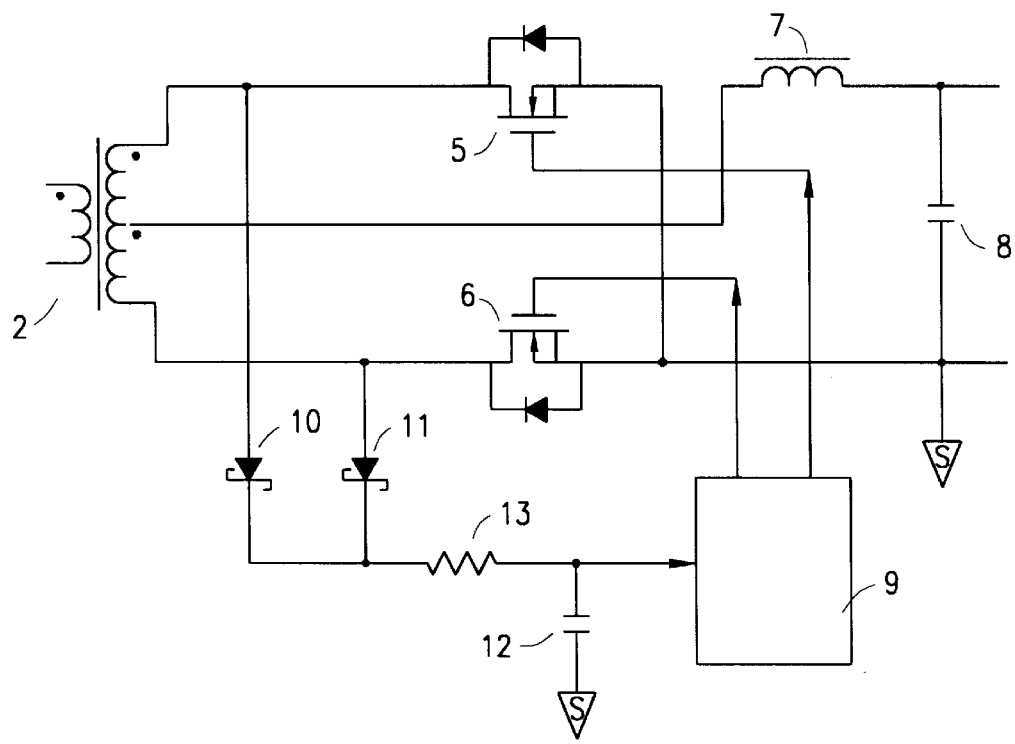
FIG. 6 is a schematic diagram of a full wave rectifier circuit according to a second preferred embodiment of the present invention.

It is understood that the present invention may be implemented in a number of ways. First, the present rectifier circuit 1 may include a resistor 13 disposed between the cathodes of diodes 10 and 11 the upper plate of capacitor 12 (FIG. 6). The presence of resistor 13 reduces surge current charging capacitor 12 during initial turn-on of transformer 2.

Figure 7:
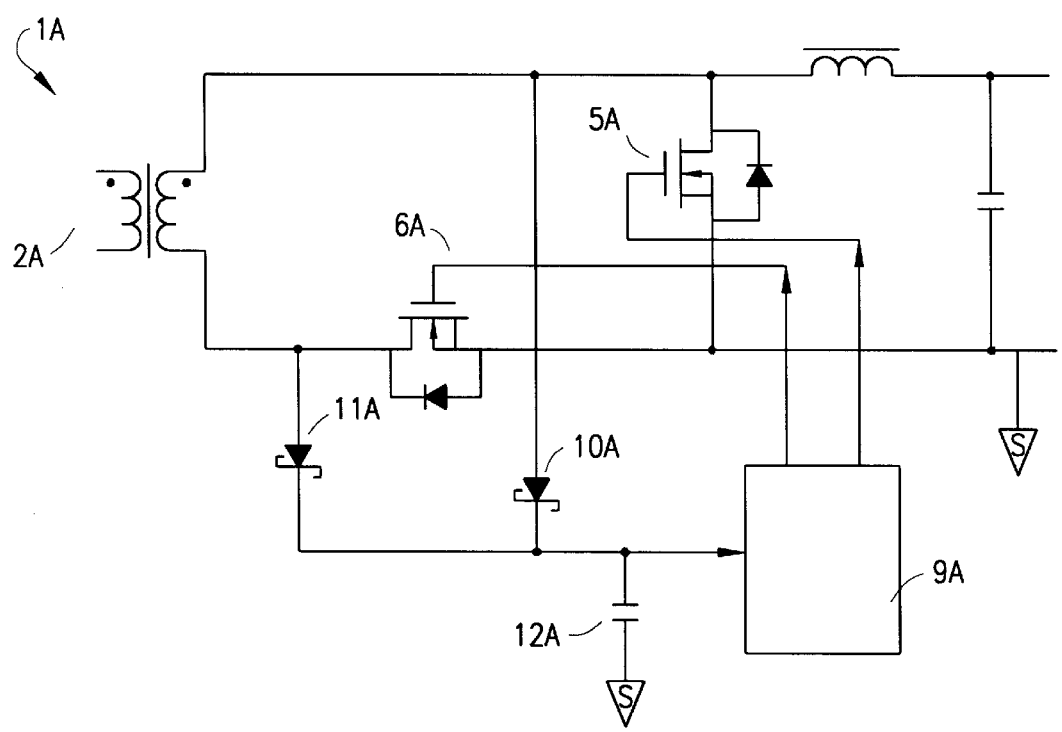
FIG. 7 is a schematic diagram of a half wave rectifier circuit according to a third preferred embodiment of the present invention.

Further, the present rectifier circuit 1 may be implemented as a half wave synchronous rectifier circuit 1A. As shown in FIG. 7, clamping diodes 10A and 11A are connected between capacitor 12A and the upper and lower ends of the second windings of transformer 2A, respectively. Diode 10A, diode 11A and capacitor 12A clamp the signals appearing on the secondary winding of transformer 2A in the same way as the embodiment of FIG. 3. The energy absorbed by capacitor 12A is recycled to drive transistor switches 5A and 6A as described above. Consequently, rectifier circuit 1A provides suitable conversion without the adverse effects of voltage spikes and high frequency ringing.

Figure 8:
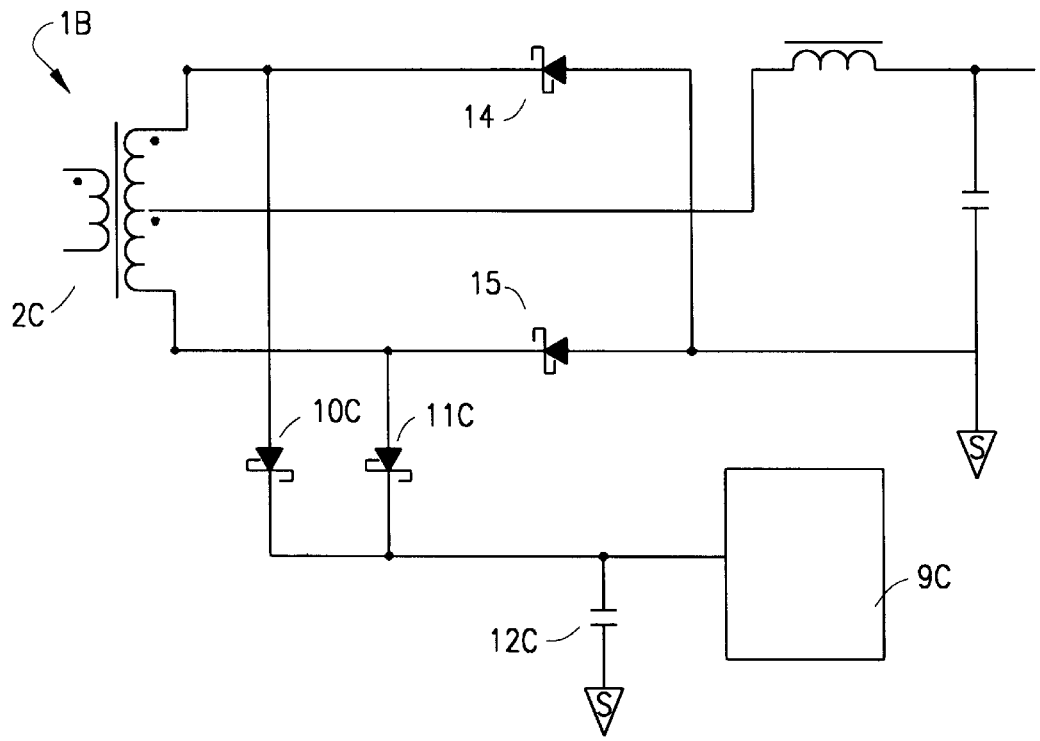
FIG. 8 is a schematic diagram of a full wave diode rectifier according to a fourth preferred embodiment of the present invention.

The present invention may be implemented as a full wave diode rectifier. As shown in FIG. 8, rectifier 1B includes Schottky diodes 14 and 15 each having their anode terminal connected to the top and bottom end of transformer 2C, respectively. Clamping diodes 10C and 11C are connected to the secondary windings of transformer 2C and to capacitor 12C so as to absorb the energy generated from parasitic components for collection at capacitor 12C. Noting that since Schottky diodes 14 and 15 are utilized in rectifier circuit 1B, the energy absorbed by diodes 10C and 11C and capacitor 12C is not recycled as in the case of the synchronous rectifiers of FIGS. 3, 6 and 7. The energy collected by capacitor 12C is dissipated by control circuit 9C in order to ensure the voltage across capacitor 12C maintains its relationship with the transformer input voltage Vin as specified above.

Figure 9:
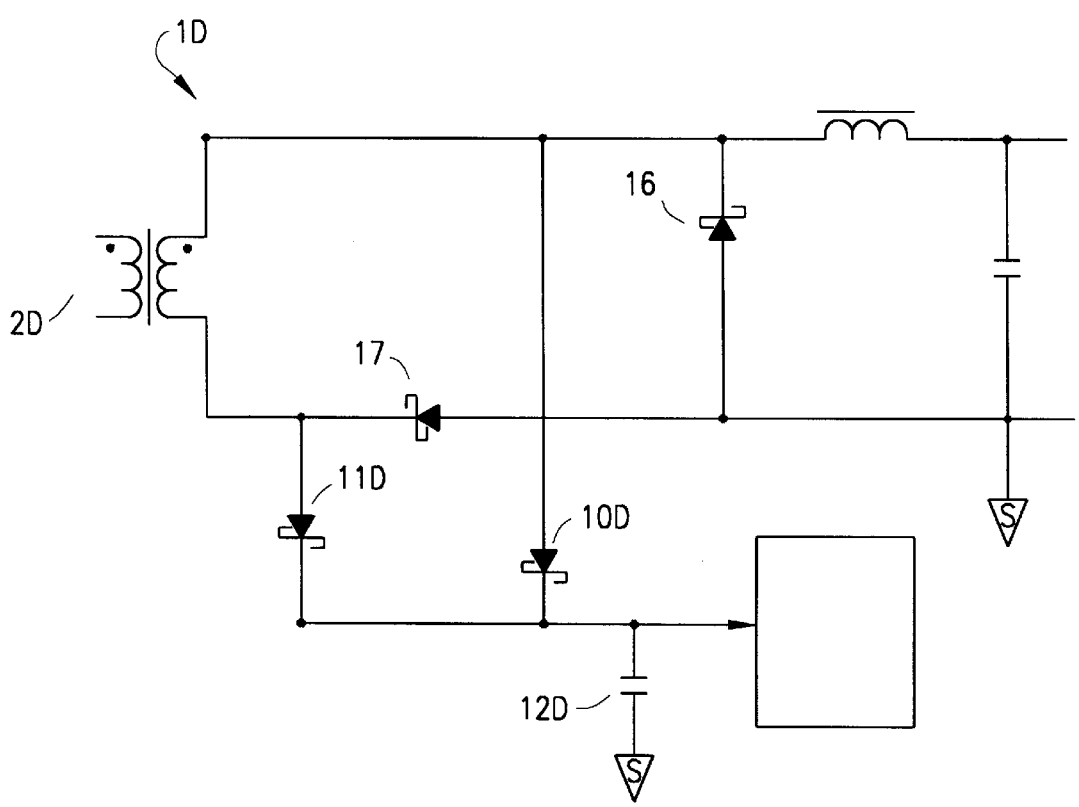
FIG. 9 is a schematic diagram of a half wave diode rectifier according to a fifth preferred embodiment of the present invention.

Still further, the present invention may be implemented as a half wave diode rectifier 1D which employs Schottky diodes 16 and 17. As shown in FIG. 9, rectifier 1D includes Schottky diodes 10D and 11D having an anode terminal connected to the top and bottom ends of the secondary winding of transformer 2D, respectively, and capacitor 12D which is connected to the cathode terminal of diodes 10D and 1D. Diode 10D, diode 11D and capacitor 12D absorb the energy generated by parasitic inductances and parasitic capacitances in rectifier 1D so as to substantially eliminate voltage spikes and high frequency ringing therein.

Figure 10:
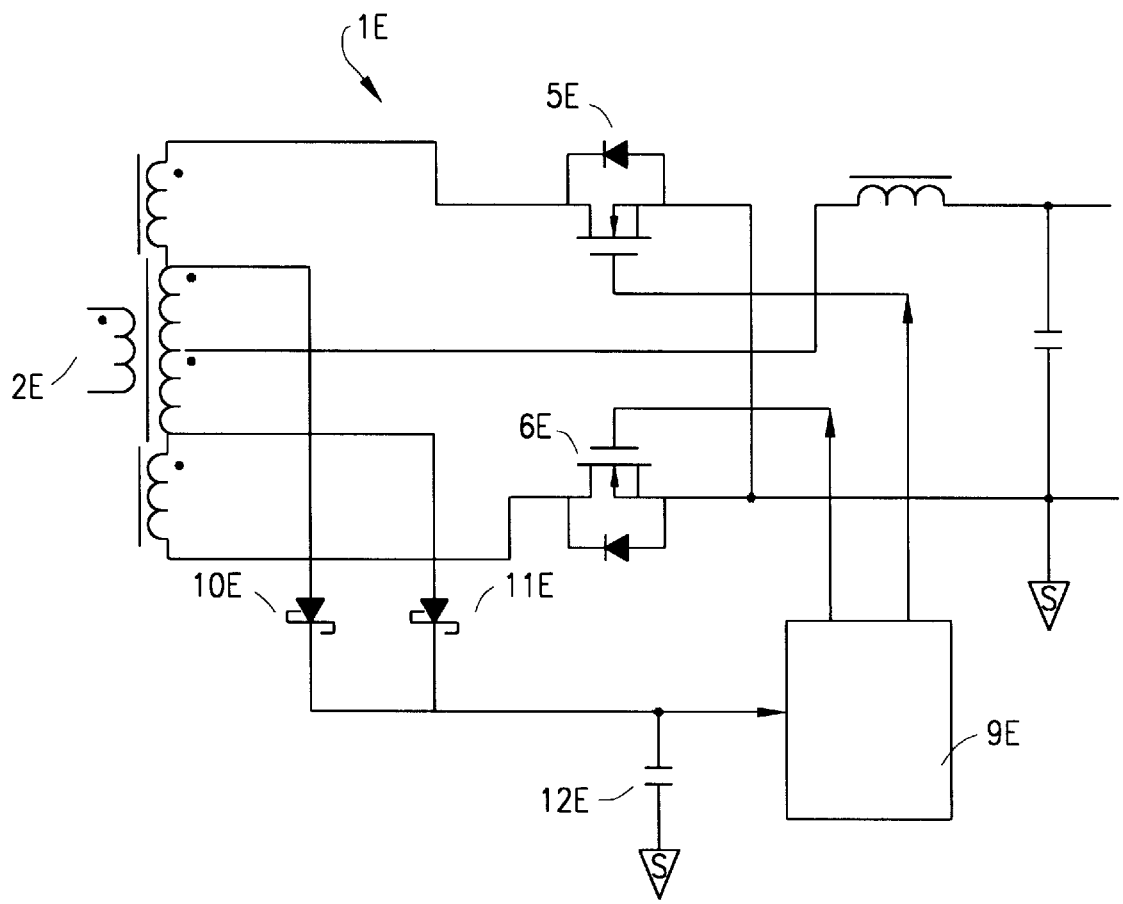
FIG. 10 is a schematic diagram of a full wave rectifier according to a sixth preferred embodiment of the present invention.

The present invention may also be implemented in a full wave rectifier 1E which only partially clamps excessive voltage spikes and ringing therein. As shown in FIG. 10, synchronous rectifier 1E includes transistor switches 5E and 6E which are connected to the top and bottom ends of the secondary windings of transformer 2E; control circuit 9E which switches transistor switches 5E and 6E between conductive and non-conductive states; and Schottky diodes 10E and 11E having an anode terminal connected to central portions of the secondary winding of transformer 2E and a cathode terminal connected to capacitor 12E. The voltage across capacitor 12E is an input to control circuit 9E so as to recycle energy absorbed thereby via diodes 10E and 11E. Because diodes 10E and 11E are tapped from a middle portion of the secondary winding of transformer 2E, voltage spikes and high frequency ringing are not clamped as well as in the rectifier circuit 1 of FIG. 3. However, the bias voltage across capacitor 12E of rectifier 1E is advantageously lowered.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rectifier circuit, comprising:
   a transformer having a primary winding and a secondary winding;
   a first rectifying element having a first terminal connected to a first end of the secondary winding of the transformer and a second terminal connected to a reference voltage;
   a second rectifying element having a first terminal connected to a second end of the secondary winding of the transformer and a second terminal connected to the reference voltage, the first and second rectifying elements rectifying a voltage provided to the primary winding of the transformer;
   a first voltage clamping element having a first terminal connected to the first end of the secondary winding of the transformer and a second terminal;
   a second voltage clamping element having a first terminal connected to the second end of the secondary winding of the transformer and a second terminal;
   a first capacitive element having a first terminal coupled to the second terminal of the first and second voltage clamping elements, the first capacitive element cooperates with the first and second voltage clamping elements to collect energy appearing at the first and second ends of the secondary winding of the transformer so that a voltage appearing on each of the first and second ends of the secondary winding is clamped to a maximum voltage approximately equaling a voltage appearing across the first capacitive element;
   an inductive element having a first end connected to the secondary winding and a second end comprising an output terminal of the rectifier circuit; and
   a second capacitive element having a first terminal connected to the second end of the inductive element and a second terminal connected to the reference voltage.

2. The rectifier circuit of claim 1, wherein: the first capacitive element comprises a capacitor that is sized so that a substantially DC voltage appears across the first and second terminals thereof.

3. The rectifier circuit of claim 1, wherein: the first voltage clamping element comprises a diode.

4. The rectifier circuit of claim 1, wherein:
   the first voltage clamping element comprises a diode having an anode terminal connected to the first end of the secondary winding of the transformer and a cathode terminal connected to the first capacitive element.

5. The rectifier circuit of claim 1, wherein: the second voltage clamping element comprises a diode.

6. The rectifier circuit of claim 1, wherein:
   the second voltage clamping element comprises a diode having an anode terminal connected to the second end of the secondary winding of the transformer and a cathode terminal connected to the first capacitive element.

7. The rectifier circuit of claim 1, wherein:
   the rectifier circuit comprises a synchronous rectifier.

8. The rectifier circuit of claim 7, wherein:
   the first rectifying element comprises a transistor having a first drain/source terminal connected to the first end of the secondary winding of the transformer and a second drain/source terminal connected to the reference voltage; and
   the second rectifying element comprises a transistor having a first drain/source terminal connected to the second end of the secondary winding of the transformer and a second drain/source terminal connected to the reference voltage.

9. The rectifier circuit of claim 8, further including:
   control circuitry for driving a control terminal of the transistor of the first rectifying element and a control terminal of the transistor of the second rectifying element so as to switch the first and second rectifying elements between conductive and non-conductive states based upon a voltage appearing across the first capacitive element.

10. The rectifier circuit of claim 9, wherein:

the control circuitry has as an input a signal appearing across the first capacitive element such that an amplitude of a signal driving the control terminal of the first rectifying element and a signal driving the control terminal of the second rectifying element are based upon the voltage appearing across the first capacitive element.

11. The rectifier circuit of claim 1, wherein:

the first and second rectifying elements each comprises a diode.

12. A method of reducing unwanted voltage spikes appearing across a secondary winding of a transformer in a rectifier circuit having first and second rectifying switch elements, comprising the steps of:

absorbing the energy pertaining to a voltage spike appearing at a first end of the secondary winding of the transformer and storing the absorbed energy in a first location within the rectifier circuit;

absorbing the energy pertaining to a voltage spike appearing at a second end of the secondary winding of the transformer and storing the absorbed energy in the first location; and recycling the energy absorbed in the first location for controlling an activation of the first and second rectifying switch elements.

13. The method of claim 12, wherein the step of recycling comprises the step of:

generating a first control signal for switching the first rectifying switch element between a conductive state and a non-conductive state based upon the energy stored in the first location; and generating a second control signal for switching the second rectifying switch element between a conductive state and a non-conductive state based upon the energy stored in the first location.

14. A rectifier circuit for a power converter application, comprising:

a transformer having a primary winding and a secondary winding;

a first rectifying device having a first terminal connected to a first end of the secondary winding and a second terminal connected to a reference voltage;

a second rectifying device having a first terminal connected to a second end of the secondary winding and a second terminal connected to the reference voltage, the first and second rectifying devices rectifying a voltage signal appearing across the primary winding of the transformer;

a first voltage clamping element having a first terminal connected to the secondary winding and a second terminal;

a second voltage clamping element having a first terminal connected to the secondary winding and a second terminal; and a first capacitor having a first plate coupled to the second terminal of the first and second voltage clamping elements and a second plate connected to the reference voltage, the first capacitor and the first and second voltage clamping elements clamping the voltage appearing at the first terminal of the first voltage clamping element and the first terminal of the second voltage clamping element at a maximum voltage approximately equaling a voltage appearing across the first capacitor;

an inductor having a first terminal connected to the secondary winding and a second terminal; and a second capacitor having a first plate connected to the second terminal of the inductor and a second plate connected to the reference voltage, the voltage across the second capacitor substantially being an output of the rectifier circuit and being a substantially DC voltage.

15. The rectifier circuit of claim 14, wherein:

the rectifier is a synchronous rectifier.

16. The rectifier circuit of claim 14, wherein:

the first voltage clamping element comprises a diode.

17. The rectifier circuit of claim 16, wherein:

an anode terminal of the diode is connected to a first end of the secondary winding of the transformer.

18. The rectifier circuit of claim 16, wherein:

an anode terminal of the diode is connected to the secondary winding of the transformer along a middle location thereof.

19. The rectifier circuit of claim 14, wherein:

the second voltage clamping element comprises a diode.

20. The rectifier circuit of claim 19, wherein:

an anode terminal of the diode is connected to a second end of the secondary winding of the transformer.

21. The rectifier circuit of claim 19, wherein:

an anode terminal of the diode is connected to the secondary winding of the transformer along a middle location thereof.

22. The rectifier circuit of claim 14, wherein:

each of the first and second rectifying elements comprises a switch having a control terminal for switching between conductive and non-conductive states; and the rectifier circuit further comprises control circuitry for generating signals for controlling the control terminal of the first and second rectifying elements based upon a voltage level appearing across the first capacitor.

23. The rectifier circuit of claim 14, wherein:

the first capacitor is sized so that the voltage appearing across the first capacitor is a substantially DC voltage.

24. The rectifier circuit of claim 14, wherein:

the first terminal of the inductor is connected to the first end of the secondary winding.

25. The rectifier circuit of claim 14, wherein:

the first terminal of the inductor is connected to a portion of the winding other than the first or second end thereof.

26. The rectifier circuit of claim 14, wherein:

the first and second rectifying devices comprise diodes.

27. The rectifier circuit of claim 14, wherein:

the first terminal of the first rectifying device is connected to a first portion of the secondary winding other than the first and second ends thereof; and the first terminal of the second rectifying device is connected to a second portion of the secondary winding other than the first and second ends thereof.

28. The rectifier circuit of claim 14, further comprising:

a resistor connected between the first plate of the capacitor and the second terminal of the first and second voltage clamping elements.

* * * * *

UNITED STATES PATENT AND TRADEMARK OFFICE
CERTIFICATE OF CORRECTION

PATENT NO : 6,128,206
DATED : October 3, 2000
INVENTOR(S) : Sun, et al.

It is certified that error appears in the above-identified patent and that said Letters Patent are hereby corrected as shown below:

Column 3, line 18     Replace "Rectified"
                          With --Rectifier--

Column 5, line 33     Replace "and 1D."
                          With --and 11D.--

Signed and Sealed this

Twenty-second Day of May, 2001

Attest:

NICHOLAS P. GODICI

*Attesting Officer*     *Acting Director of the United States Patent and Trademark Office*